United States Patent
Gyss et al.

(10) Patent No.: US 8,438,255 B2
(45) Date of Patent: May 7, 2013

(54) UNIT AND METHOD FOR MANAGING AT LEAST ONE CHANNEL IN AN ACCESS SESSION FOR ACCESSING A SERVICE IN A NETWORK

(75) Inventors: Jean-François Gyss, Rospez (FR); Eric Paillet, Tregastel (FR); Vincent Teze, Landeda (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/307,123

(22) PCT Filed: Jun. 29, 2007

(86) PCT No.: PCT/FR2007/051570
§ 371 (c)(1),
(2), (4) Date: Jan. 6, 2010

(87) PCT Pub. No.: WO2008/003892
PCT Pub. Date: Jan. 10, 2008

(65) Prior Publication Data
US 2010/0115086 A1    May 6, 2010

(30) Foreign Application Priority Data
Jul. 3, 2006    (FR) ..................... 06 52777

(51) Int. Cl.
*G06F 15/173* (2006.01)
(52) U.S. Cl.
USPC ........................................ 709/223

(58) Field of Classification Search ........... 709/223–224
See application file for complete search history.

(56) References Cited

U.S. PATENT DOCUMENTS

| 7,693,541 | B1* | 4/2010 | Shao et al. ............ 455/552.1 |
| 2002/0035626 | A1* | 3/2002 | Higuchi ............... 709/223 |
| 2004/0024845 | A1* | 2/2004 | Fishhaut et al. ......... 709/219 |
| 2005/0193118 | A1* | 9/2005 | Le et al. .............. 709/227 |
| 2006/0031497 | A1* | 2/2006 | Beartusk et al. ......... 709/225 |
| 2006/0090198 | A1 | 4/2006 | Aaron |
| 2007/0136448 | A1* | 6/2007 | Da Palma et al. ........ 709/223 |

FOREIGN PATENT DOCUMENTS
WO    WO 03/056859    7/2003

* cited by examiner

*Primary Examiner* — Jason Recek
(74) *Attorney, Agent, or Firm* — Knobbe Martens Olson & Bear LLP

(57) ABSTRACT

A management unit for managing a channel in a telecommunications network includes a registering section configured to define and register a visibility attribute associated with a first channel, belonging to a first session, for accessing a service in the telecommunications network. A receiving section is configured to receive a request to obtain information on the first channel from a second channel. The second channel belongs to the first session or a second session for accessing the service. A sending section is configured to determine and send a response to the request to obtain information on the first channel, taking into account the visibility attribute associated with the first channel, and further taking into account whether the second channel belongs to the first session or the second session.

11 Claims, 3 Drawing Sheets

|  | S PRIV C PRIV | S PRIV C PROT | S PRIV C PUB | S PUB C PRIV | S PUB C PROT | S PUB C PUB | |
|---|---|---|---|---|---|---|---|
| D PRIV | VIS | VIS | VIS | VIS | VIS | VIS | T1 |
| D PROT | VIS | VIS | VIS | VIS | VIS | VIS | |
| D PUB | VIS | VIS | VIS | VIS | VIS | VIS | |

|  | S PRIV C PRIV | S PRIV C PROT | S PRIV C PUB | S PUB C PRIV | S PUB C PROT | S PUB C PUB | |
|---|---|---|---|---|---|---|---|
| D PRIV | INVIS | INVIS | INVIS | INVIS | INVIS | INVIS | T2 |
| D PROT | INVIS | VIS | VIS | INVIS | VIS | VIS | |
| D PUB | INVIS | VIS | VIS | INVIS | VIS | VIS | |

|  | S PRIV C PRIV | S PRIV C PROT | S PRIV C PUB | S PUB C PRIV | S PUB C PROT | S PUB C PUB | |
|---|---|---|---|---|---|---|---|
| D PRIV | INVIS | INVIS | INVIS | INVIS | INVIS | INVIS | T3 |
| D PROT | INVIS | INVIS | INVIS | INVIS | INVIS | INVIS | |
| D PUB | INVIS | INVIS | INVIS | INVIS | INVIS | VIS | |

FIG.3

UNIT AND METHOD FOR MANAGING AT LEAST ONE CHANNEL IN AN ACCESS SESSION FOR ACCESSING A SERVICE IN A NETWORK

RELATED APPLICATIONS

This is a U.S. National Phase Application under 35 USC §371 of International Application PCT/FR2007/051570, filed on Jun. 29, 2007.

This application claims the priority of French application no. 06/52777 filed on Jul. 3, 2006, and the content of which is hereby incorporated by reference.

BACKGROUND OF THE INVENTION

The field of the invention is that of interactive services in a telecommunications network.

Although this is not limiting on the invention, the field of the invention is more particularly that of interactive multimode services.

The term "multimode" refers generally to alternating or parallel use of a plurality of modes in a combined or redundant way.

From the system point of view, an input or output mode is defined by:
 a representational system;
 a physical interaction device; or
 a representational system and a physical interaction device in association.

By way of non-limiting example, the invention applies to interactive services accessible in one or more of the following modes:
 fixed telephone;
 mobile telephone;
 Internet Protocol (IP) telephone;
 Internet access;
 video.

A user (a physical person or a device) accesses a service during a session that is linked to that user and during which one or more channels are set up.

A session set up between two entities is controlled (set up, maintained, released, etc.) by control means distributed between those entities.

In the present document, data managed by at least part of these session control means is referred to as data "attached" to the session.

A communications channel between two entities is defined by a payload data stream (voice, video, etc.), means for controlling this stream being distributed between the two entities. The data managed by these channel control means is referred to as data "attached" to the channel.

Data attached to a first session or a first channel is said to be "visible" from a second session or from a second channel if the control means of that second session or that second channel are aware of the existence of the data. Otherwise the data is referred to as "invisible".

Finally, if data is visible, it can be visible:
 in "read" mode, if its value can only be obtained; or
 in "read/write" mode, if its value can also be modified.

Moreover, and notably in the context of multimode services, one or more users can access the same service with a number of sessions, each including one or more channels.

For example, a user might access a server via a voice channel of a first session set up between that server and a mobile telephone of that user and simultaneously via a video channel of a second session with a computer of the same user.

At present, the deployment of multimode services remains limited because it is not possible in the current state of the art to share information between the various channels, this relative impermeability effect preventing overall service consistency.

OBJECT AND SUMMARY OF THE INVENTION

A first aspect of the invention consists of a unit for managing a channel belonging to a session for accessing a service in a telecommunications network, said management unit including:
 means for registering a visibility attribute associated with said channel;
 means for receiving a request for obtaining information on a channel; and
 means for sending a response to said request taking into account the visibility attribute associated with said channel.

The management unit of the invention can define and register a visibility attribute associated with each of the channels used to access a service.

In one particular embodiment of the invention, the visibility attributes that can be associated with a channel are as follows:
 "public", a public channel being visible to all other channels;
 "protected", a protected channel being visible to all the other channels of the session of that channel; and
 "private", a private channel not being visible to any other channel.

According to an embodiment of the invention, when the management unit receives a request to obtain information on a channel, it prepares a response taking into account the visibility attribute associated with the channel.

For example, when the management unit receives a request to obtain a list of visible channels, it responds to that request by returning a list of the references of the public channels.

If none of the channels are public channels, the management unit of the invention returns a value (NULL) representing that fact.

In one embodiment of the invention, if the request to obtain information on a first channel comes from a second channel, the response takes into account the sessions to which the first and second channels belong.

For example, the management unit according to an embodiment of the invention returns information on a protected channel only in response to requests coming from a channel of the same session as that channel.

The invention can also apply when two or more sessions provide access to the same service.

In one particular embodiment of the invention, the management unit includes:
 means for registering a visibility attribute associated with a session;
 means for receiving a request to obtain information on a session; and
 means for sending a response to said request taking into account the visibility attribute associated with the session.

One particular embodiment also provides visibility attributes of sessions.

In one particular embodiment, the visibility attribute of a session can be of two types:
 "public", a public session being visible to all sessions;
 "private", a private session being visible only to the channels of that session.

In one particular embodiment of the invention, to respond to a request to obtain information on a channel, the management unit takes into account the visibility attribute of the session to which that channel belongs and a set of rules.

This set of rules defines, as it were, the prevalence between the visibility attribute associated with a session and the visibility attribute associated with a channel of that session.

This set of rules in particular resolves visibility conflicts that arise when a protected or public channel belongs to a private session.

In one particular embodiment of the invention, the management unit includes:
- means for registering a visibility attribute associated with data;
- means for receiving a request to obtain information on data; and
- means for sending a response to said request taking into account the visibility attribute associated with the data.

This particular embodiment assigns a visibility attribute to the data used in the context of a service.

In one particular embodiment of the invention, the visibility attributes that can be associated with data are as follows:
- "public", public data being visible to all sessions;
- "protected", protected data being visible only to channels of the same session; and
- "private", private data not being visible either to other sessions or to other channels of the same session.

In one particular embodiment of the invention, the management unit further includes:
- means for registering a read and/or write right associated with data;
- means for receiving a request to read or modify data; and
- means for sending a response to said request taking into account the right and the visibility attribute associated with said data.

As mentioned above, data can be attached to a channel or directly to a session.

In one particular embodiment, when a third party sends a request to access data attached to a channel, to respond to that request the management unit of the invention takes into account the visibility attribute of that channel and a set of rules.

This set of rules in particular resolves visibility conflicts that arise when public data is attached to a protected or private channel.

In one particular embodiment of the invention, when data is attached to a session, the management unit takes into account the visibility attribute of that session and a set of rules.

This set of rules in particular resolves visibility conflicts that arise when public or protected data belongs to a private session.

In one particular embodiment, to respond to a request to obtain information on data, the management unit of the invention takes into account the session to which that data is attached and the session from which the request comes.

This embodiment therefore provides information on protected data only in response to requests coming from a channel belonging to the same session.

Another aspect of the invention is directed to a method of managing a channel belonging to a session for accessing a service in a telecommunications network.

This management method includes:
- a step of registering a visibility attribute associated with said channel;
- a step of receiving a request to obtain information on a channel; and
- a step of sending a response to the request taking into account the visibility attribute associated with the channel.

The advantages and particular implementations of the management method of the invention are identical to those referred to above in relation to the management device of the invention. They are not repeated here.

In one particular implementation, the various steps of the management method are determined by computer program instructions.

Consequently, another aspect of the invention is directed to a computer program on an information medium, this program being adapted to be executed in a management unit or more generally in a computer and including instructions adapted to execute the steps of the above management method.

This program can use any programming language and can take the form of source code, object code or a code intermediate between source code and object code, such as a partially-compiled form, or any other desirable form.

Another aspect of the invention is directed to a computer-readable information medium containing instructions of the above computer program.

The information medium can be any entity or device capable of storing the program. For example, the medium can include storage means, such as a ROM, for example a CD ROM or a microelectronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit incorporating the program, the circuit being adapted to execute the method in question or to be used in its execution.

BRIEF DESCRIPTION OF THE DRAWINGS

Other features and advantages of the present invention emerge from the description given below with reference to the appended drawings, which show a non-limiting embodiment of the invention. In the figures:

FIG. 3 represents tables that define rules for resolving visibility conflicts in one particular embodiment of the invention.

DETAILED DESCRIPTION OF THE DRAWINGS

Figure 1:
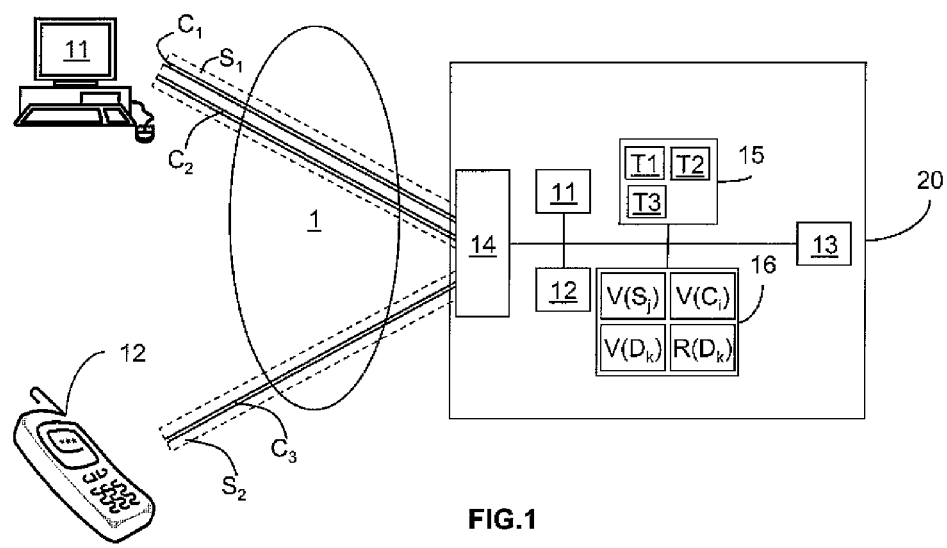
FIG. 1 represents, in its environment, a management unit conforming to one particular embodiment of the invention.

FIG. 1 represents a management unit 20 of the invention.

In the example described here, this management unit is incorporated in a server identified by the same reference number.

This management unit has the hardware architecture of a conventional computer.

It includes a processor 11, a random-access memory (RAM) 12, a read-only memory (ROM) 13, and communications means 14 for communicating with other equipment via a network 1.

Figure 2:
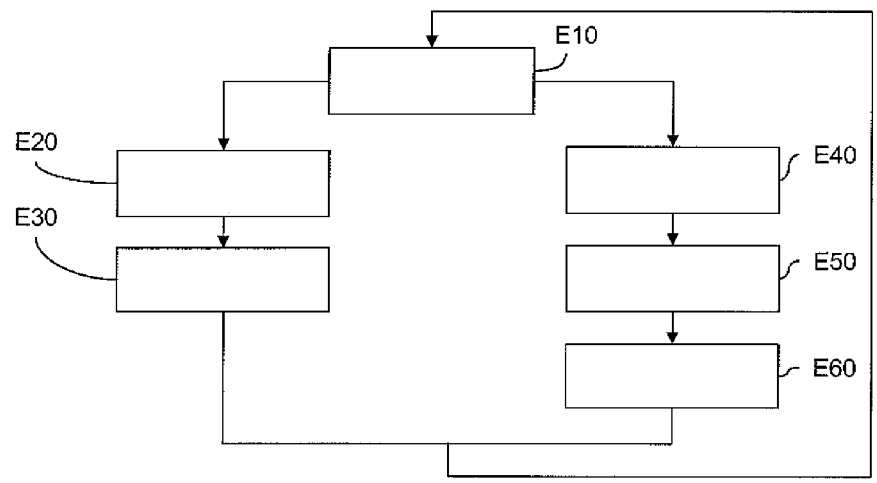
FIG. 2 represents, in the form of a flowchart, the main steps of a management method conforming to one particular embodiment of the invention.

The read-only memory 13 contains a computer program having instructions that execute the steps of the management method of the invention, shown in the flowchart of FIG. 2.

The management unit 20 of the invention includes a storage unit 15 that contains three tables T1, T2, and T3 of rules represented in FIG. 3.

The management unit 20 of the invention also includes a non-volatile rewritable memory 16 for storing:
- visibility attributes $V(S_j)$ of sessions $S_j$;
- visibility attributes $V(C_i)$ of sessions $C_i$;
- visibility attributes $V(D_k)$ of data $D_k$; and
- rights $R(D_k)$ of the data $D_k$.

In the example described here, the attributes $V(S_j)$ of a session $S_j$ can be of two types:
- "public" (PUB), in which case the session $S_j$ is visible to other sessions that can consult the data attached to it; or
- "private" (PRIV), in which case the session $S_j$ and the data attached to that session are not visible to other sessions.

In the example described here, the visibility attributes $V(C_i)$ of a channel $C_i$ can be of three types, namely:
- "public" (PUB), in which case the channel $C_i$ is visible to all other sessions;
- "protected" (PROT), in which case the channel $C_i$ is visible to channels of the same session as that channel; or
- "private" (PRIV), in which case the channel is not visible to other sessions or to other channels of the same session.

In the example described here, the visibility attributes $V(D_k)$ of the data $D_k$ can be of three types, namely:
- "public" (PUB), in which case the data is visible to all other sessions;
- "protected" (PROT), in which case the data is visible only to channels of the same session; or
- "private" (PRIV), in which case the data is visible neither to other sessions nor to other channels of the same session.

The three tables T1, T2, and T3 stored in the storage unit 15 define rules for resolving conflicts between:
- the visibility attribute $V(S_j)$ of a session $S_j$;
- the visibility attribute $V(C_i)$ of a channel $C_i$ of that session $S_j$; and
- the visibility attribute $V(D_k)$ of data $D_k$ attached to the channel $C_i$ or to the session $S_j$.

In the particular example described here, it is considered necessary for:
- a session $S_j$ to be visible so that the channels $C_i$ of that session are themselves visible; and
- a channel $C_j$ itself to be visible so that the data $D_k$ attached to that channel is visible.

Assume that a user accesses the same service on the server 20 from two terminals, namely a personal computer 11 and a mobile telephone 12, via the telecommunications network 1. To be more precise, assume that, in this example:
- a first session $S_1$ has been set up between the computer 11 and the server 20, this first session $S_1$ including a voice channel $C_1$ and a visual channel $C_2$; and
- a second session $S_2$ has been set up between the mobile telephone 12 and the server 20, this second session including only a voice channel $C_3$.

Table T1 contains the rules used by the management unit 20 to resolve visibility conflicts that arise when:
- data attached to a session $S_j$ is accessed from the same session $S_j$; or
- data attached to a channel $C_i$ is accessed from the same channel $C_i$.

The table T2 contains rules used by the management unit 20 to resolve visibility conflicts that arise when the requirement is to access data attached to a first channel via a second channel of the same session.

The table T3 contains rules used by the management unit 20 to resolve visibility conflicts that arise when the requirement is to access data attached to a session or a channel from another session.

The following notation is used in each of these tables:
- "VIS" if the data $D_k$ can be rendered visible as a function of the visibility attributes $V(S_j)$, $V(C_i)$ and $V(D_k)$; and
- "INVIS" if the data must remain invisible.

Table T1 indicates that in this embodiment data attached to a session is always visible from that session and that data attached to a channel is always visible from that channel.

Table T2 indicates that private data attached to a channel is invisible from all other channels of the same session and that data attached to a private channel is invisible from other channels of the same session, even if the data is public data.

Table T3 indicates that, for data to be visible from another session, the channel and the session to which that data belongs must be public.

The main steps of the management method implemented by the management unit 20 are described below with reference to FIG. 2.

In the remainder of the description, the term "object" refers interchangeably to a session, a channel or data.

From a general point of view, the management method of the invention consists of a request processing loop comprising steps E10 to E60.

The step E10 corresponds to reception of requests.

These requests can be of various types:
- requests to register an object, including a visibility attribute associated with that object; on reception of a request to register an unregistered object, the management unit 20 stores the visibility attribute in the non-volatile memory 16;
- requests to dereference (unregister) an object, to eliminate an object from the non-volatile memory 16;
- requests to obtain a list of public object references;
- requests to modify the visibility attribute of an object, these requests being processed by the management unit 20 only if they come from the session to which that object belongs;
- requests to modify the information associated with a public object;
- requests to obtain information on a public object.

If the request received in the step E10 is a registration or dereferencing request, the step E10 is followed by a step E20 during which the management unit 20 registers or eliminates the reference of an object and the visibility attributes of that object in the non-volatile memory 16.

This registration or dereferencing step E20 is followed by a step E30 during which the management unit 20 sends a response to the request received in the step E10, this response containing either the reference of the object or a NULL value if an error has occurred.

An error can in particular occur if a registration or dereferencing request in respect of a channel is received from a session other than that to which that channel belongs.

This step E30 of sending a response is followed by the step E10 of receiving the next request.

When the management unit 20 of the invention receives a request for obtaining or modifying information on an object, the request reception step E10 is followed by a step E40 of obtaining at least one visibility criterion.

If the request relates to a session $S_j$, the visibility attribute $V(S_j)$ of that session is obtained from the non-volatile memory 16 during this step.

If this request relates to a channel $C_i$, the visibility attribute $V(C_i)$ of that channel and the visibility attribute of the session to which that channel belongs are obtained from the non-volatile memory 16.

If the request relates to data $D_k$, the visibility attribute $V(D_k)$ of that data, where applicable the visibility attribute $V(C_i)$ of the channel to which that data is attached, and where applicable the visibility attribute $V(S_j)$ of the session to which that data is attached are obtained from the non-volatile memory 16.

The step E40 of obtaining visibility criteria is followed by a step E50 of managing visibility conflicts.

In the example described here, if this request relates to data, this conflict management step consists in obtaining the value "VIS" or "INVIS" from the tables T1 to T3.

If the management unit 20 obtains the value "INVIS", the constant NULL is returned in response to the request to represent the fact that the data is invisible and that the information requested is not accessible.

In contrast, if the value "VIS" is obtained, i.e. if the requested data $D_k$ is visible, the response to the request depends on the rights $R(D_k)$ associated with that data.

To be more precise, if these rights are reading rights, the data $D_k$ can only be read.

If these rights are writing rights, the data $D_k$ can also be modified.

Figure 4:
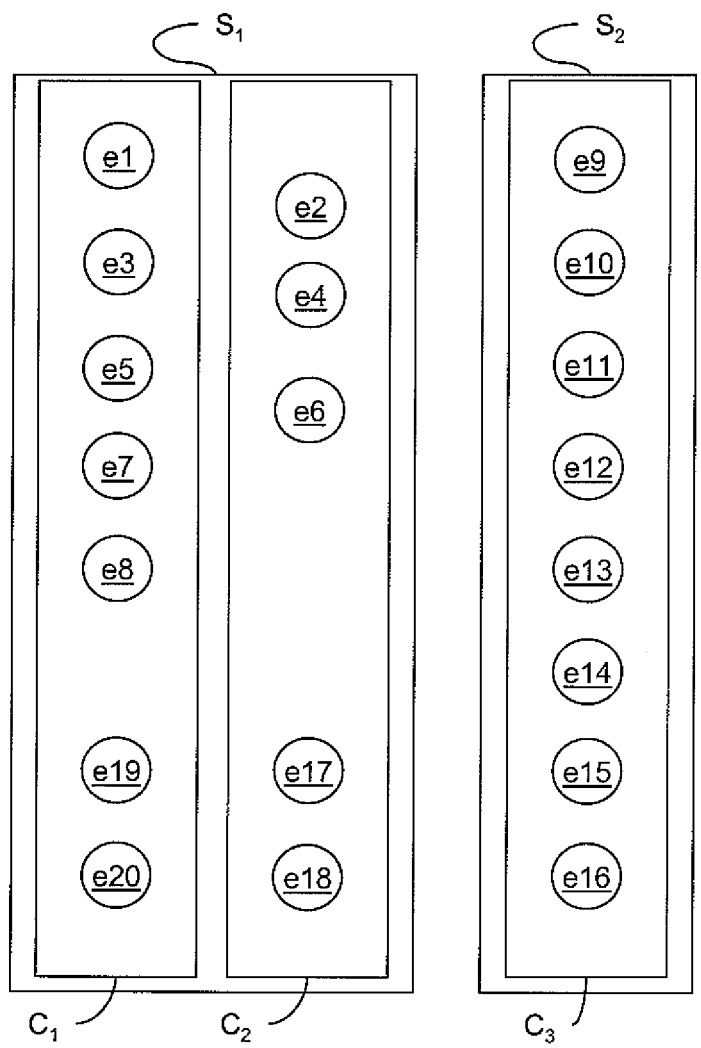
FIG. 4 is a diagram representing one example of use of the invention.

A scenario conforming to the invention for managing the channels $C_1$, $C_2$, $C_3$ set up by the computer 11 and the mobile telephone 12 to access the server 20 from FIG. 1 is described below with reference to FIG. 4.

During a step e1, the voice mode of the computer 11 requests referencing of the session $S_1$ by sending a referencing request.

This referencing request is received during the step E10. As the management unit 20 is unaware of the session $S_1$, a reference $RefS_1$ is created (step E20) and returned (step E30) to the personal computer 11 in the channel $C_1$.

During a step e2, the visual mode of the computer 11 requests referencing of the session $S_1$. As the session is stored in the volatile memory 16, the reference $RefS_1$ of this session is returned to the computer 11 via the channel $C_2$.

During a step e3, the voice mode of the computer 11 requests referencing of the channel $C_1$ in the management unit 20.

The reference $RefC_1$ is created (step E20) and returned to the personal computer 11 via the channel $C_1$.

During a step e4, the voice mode of the computer 11 requests referencing of the visual channel $C_2$. The reference $RefC_2$ is created and sent to the computer 11 via the channel $C_2$.

During a step e5, the voice mode of the computer 11 stores data A (session level data attached to the session $S_1$).

During a step e6, the visual mode of the computer 11 registers data B attached to the visual channel $C_2$.

During a step e7, the voice mode of the computer 11 obtains a list of the visible channels of the session $S_1$ from the management unit 20.

During a step e8, the voice mode of the computer 11 accesses the data B attached to the channel $C_2$, if the voice mode of the computer 11 has the right to read that data.

During a step e9, the voice mode of the mobile telephone 12 requests referencing of the session $S_2$. As $S_2$ is not referenced in the management unit 20, a reference $RefS_2$ is created and returned to the mobile telephone 12 via the channel $C_3$.

During a step e10, the voice mode of the computer 11 requests referencing of the channel $C_3$. The reference $RefC_3$ is created and returned to the voice mode of the mobile telephone 12 via the channel $C_3$.

During a step e11, the voice mode of the mobile terminal 12 obtains a list of visible sessions from the management unit 20.

During a step e12, the voice mode of the mobile terminal 12 accesses the data A of the session $S_1$ if this voice mode has the right to read that data.

During a step e13, the voice mode of the mobile terminal 12 recovers the list of the visible channels of the session $S_1$ from the management unit 20.

During a step e14, the voice mode of the mobile terminal 12 accesses the data B attached to the channel $C_2$ if this voice mode has the right to read that data.

During a step e15, the voice mode of the mobile terminal 12 requests dereferencing of the channel $C_3$.

The reference $RefC_3$ is eliminated from the non-volatile memory 16.

During a step e16, the voice mode of the mobile terminal 12 requests dereferencing of the session $S_2$.

The reference $RefS_2$ is eliminated from the non-volatile memory 16.

During a step e17, the visual mode of the computer 11 requests dereferencing of the channel $C_2$.

The reference $RefC_2$ is eliminated.

During a step e18, the visual mode of the computer 11 requests dereferencing of the session $S_1$.

As the reference $RefS_1$ is also used by the voice mode of the computer 11, it is not eliminated from the non-volatile memory 16.

During a step e19, the voice mode of the computer 11 requests dereferencing of the voice channel $C_1$.

The reference $RefC_1$ is eliminated.

During a step e20, the voice mode of the computer 11 requests dereferencing of the session $S_1$.

As the reference $RefS_1$ is no longer used by any mode, it is eliminated from the session register.

In the embodiment described here, the management method of the FIG. 2 flowchart is applied to a set of functions specified below.

The instructions of each of these functions are stored in the non-volatile ROM 13 of the unit 20 of the invention.

A) Session Level Functions

1) Registering a Session

The "registerSession" function registers a session. It includes the following parameters:

| Parameter | Type | Comment |
| --- | --- | --- |
| idUser | Obligatory parameter | Session identifier |
| Visibility | Obligatory parameter | Session visibility Possible values: PUB: session is visible to all other sessions; PRIV: session is visible only to channels of the same session |
| | Return value | If the session is new, the return value is the reference of the registered new session If the session exists already (i.e. if the idUser parameter is the same) the return value is the reference of the existing session If an error occurs, the return value is "NULL" |

2) Obtaining a List of Visible Sessions

The "getListSession" function obtains a list of references of sessions registered with "public" visibility.

| Parameter | Type | Comment |
|---|---|---|
| | Return value | List of references of sessions having "PUB" type visibility If an error occurs, the return value is "NULL" |

3) Updating the Visibility of a Session

The "setSessionScope" function updates the visibility of a session. Only a session can modify its visibility.

| Parameter | Type | Comment |
|---|---|---|
| refSession | Obligatory parameter | Session reference |
| Visibility | Obligatory parameter | Session visibility Possible values: PUB: session is visible to all other sessions; PRIV: session is visible only to channels of the same session |
| | Return value | Session reference or "NULL" if an error occurs (for example sent by another session) |

4) Modifying Information on a Session

The "setSessionInfo" function modifies the information on a session with visibility of "PUB" type.

| Parameter | Type | Comment |
|---|---|---|
| refSession | Obligatory parameter | Session reference |
| refInfo | Obligatory parameter | Reference of the information of the session |
| | Return value | Reference of the information of the session If an error occurs, the return value is "NULL" |

5) Obtaining Information on a Session

The "getSessionInfo" obtains information on a session with visibility of type "PUB".

| Parameter | Type | Comment |
|---|---|---|
| refSession | Obligatory parameter | Session reference |
| | Return value | Reference of the information of the session (containing its visibility, number of visible channels, etc.) If an error occurs, the return value is "NULL" |

6) Dereferencing a Session

The "unregisterSession" function dereferences a session.

| Parameter | Type | Comment |
|---|---|---|
| refSession | Obligatory parameter | Session reference |
| | Return value | If the session has no more channels attached, the return value is the reference of the session that has just been eliminated Otherwise, the return value is "NULL" |

B) "Channel" Level Functions

1) Registering a Channel

The "registerChannel" function registers a referenced channel.

| Parameter | Type | Comment |
|---|---|---|
| refSession | Obligatory parameter | Reference of session to which channel belongs |
| Visibility | Obligatory parameter | Channel visibility Possible values: PUB: channel is visible to all other channels, regardless of session PROT: channel is visible to all other channels of the session PRIV: channel is not visible to any other channel If a channel belongs to a private session, it is not visible from other sessions regardless of the rights attached to the channel In other words, session level rights take precedence over channel level rights |
| idChannel | Obligatory parameter | Channel identifier The format of this information is unrestricted For example it can take the values 1, 2, 3, . . . or Web, Voice, TV, . . . |
| | Return value | Reference of the registered new channel or "NULL" if an error occurs (rights or creation problem) |

2) Obtaining a List of Visible Channels

The "getListChannel" function obtains a list of the references of channels registered with a visibility of "PUB" type.

| Parameter | Type | Comment |
|---|---|---|
| refChannel | Obligatory parameter | Session reference |
| | Return value | Lisr of references of channels having visibility of "PUB" type or "NULL" if an error occurs |

3) Modifying the Visibility of a Channel

The "setChannelScope" function updates the visibility of a channel.

| Parameter | Type | Comment |
|---|---|---|
| refChannel | Obligatory parameter | Channel reference |
| Visibility | Obligatory parameter | Channel visibility Possible values: PUB: channel is visible to all other channels, regardless of session PROT: channel is visible to all other channels of the session PRIV: channel is not visible to any other channel of the same session |
| | Return value | Channel reference or "NULL" if an error occurs (rights or visibility problem) |

4) Modifying Information on a Session

The "setChannelInfo" function modifies information associated with a channel with visibility of "PUB" type.

| Parameter | Type | Comment |
|---|---|---|
| refChannel | Obligatory parameter | Channel reference |
| refInfo | Obligatory parameter | Reference of the information of the channel |
| | Return value | Reference of the information of the channel or "NULL" if an error occurs |

5) Obtaining Information on a Channel

The "getChannelInfo" function obtains information on a channel of a session.

| Parameter | Type | Comment |
|---|---|---|
| refChannel | Obligatory parameter | Channel reference |
| | Return value | Reference of the information of the channel (containing scope, type of channel, etc.) or "NULL" if an error occurs |

6) Dereferencing a Channel

The "unregisterChannel" function dereferences a channel of a session.

| Parameter | Type | Comment |
|---|---|---|
| refChannel | Obligatory parameter | Channel reference |
| | Return value | Reference of channel that has just been eliminated or "NULL" if an error occurs |

C) "Data" Level Functions

1) Registering Data a) Registering Session Level Data

The "registerSessionData" function registers session level data.

| Parameter | Type | Comment |
|---|---|---|
| refSession | Obligatory parameter | Session reference |
| Visibility | Obligatory parameter | Visibility of data: PUB: data is visible to all PROT: data is visible only to channels of the same session PRIV: data is not visible to other sessions or to other channels of the same session If session level data belongs to a private or protected session, it is not visible from other sessions regardless of the rights attached to the data In other words session level takes precedence over data level |
| Rights | Obligatory parameter | Rights to manipulate data Possible values: RW: data is accessible in read mode and in write mode R: data is accessible only in read mode W: data is accessible only in write mode |
| idData | Obligatory parameter | Data identifier The format of this information is unrestricted (character string) |
| | Return value | Reference of the registered data or "NULL" if an error occurs (compatibility of visibility or rights or creation problem) | b) Registering Channel Level Data

The "registerChannelData" function registers channel level data (for a given session).

| Parameter | Type | Comment |
|---|---|---|
| refChannel | Obligatory parameter | Channel reference |
| Visibility | Obligatory parameter | Visibility of data: PUB: data is visible to all PROT: data is visible only to channels of the same session PRIV: data is not visible to other sessions or to other channels of the same session If channel level data belongs to a private or protected session, it is not visible from other sessions regardless of the rights attached to the data In other words, session level takes precedence over data level |
| Rights | Obligatory parameter | Rights to manipulate data Possible values: RW: data is accessible in read mode and in write mode R: data is accessible only in read mode W: data is accessible only in write mode |
| idData | Obligatory parameter | Data identifier The format of this information is unrestricted (character string) |
| | Return value | Reference of registered data or "NULL" if an error occurs (compatibility of visibility or rights or creation problem) |

2) Modifying the Visibility of Data

The "setDataScope" function modifies the visibility of data.

| Parameter | Type | Comment |
| --- | --- | --- |
| refData | Obligatory parameter | Data reference |
| Visibility | Obligatory parameter | Visibility of data:<br>PUB: data is visible to all<br>PROT: data is visible only to channels of the same session<br>PRIV: data is not visible to other sessions or to other channels of the same session<br>To modify the visibility of data, a channel must have rights to write the data |
| | Return value | Data reference or "NULL" if an error occurs (compatibility of visibility or rights problem) |

3) Modifying Rights Associated with Data

The "setDataRights" function modifies the rights associated with data.

| Parameter | Type | Comment |
| --- | --- | --- |
| refData | Obligatory parameter | Data reference |
| Rights | Obligatory parameter | Rights to manipulate data<br>Possible values:<br>RW: data is accessible in read mode and in write mode<br>R: data is accessible only in read mode<br>W: data is accessible only in write mode |
| | Return value | Data reference or "NULL" if an error occurs (compatibility of visibility or rights problem) |

4) Modifying the Value of Data

The "setData" function modifies the value of data.

| Parameter | Type | Comment |
| --- | --- | --- |
| refData | Obligatory parameter | Data reference |
| data | Obligatory parameter | Reference of the value of the data |
| | Return value | Data reference or "NULL" if an error occurs (compatibility of visibility or rights or creation problem) |

5) Obtaining Information on Data

The "getDataInfo" function obtains information on data. The data must be associated with a visibility of "PUB" type.

| Parameter | Type | Comment |
| --- | --- | --- |
| refData | Obligatory parameter | Data reference |
| | Return value | Reference of information on data (containing proprietor, visibility and access rights, etc.) or "NULL" if an error occurs (compatibility of visibility or rights problem) |

6) Obtaining the Value of Data

The "getData" function obtains the value of data.

| Parameter | Type | Comment |
| --- | --- | --- |
| refData | Obligatory parameter | Data reference |
| | Return value | Reference of the value of the data or "NULL" if an error occurs (compatibility of visibility or rights problem) |

7) Obtaining a List of Visible Data a) Obtaining a List of Session Level Visible Data The "getListSessionData" function obtains a list of the references of the visible data registered for a session. The visibility of the session to which the data belongs must be of "PUB" type.

| Parameter | Type | Comment |
| --- | --- | --- |
| refSession | Obligatory parameter | Session reference |
| | Return value | List of references of visible data or "NULL" in the event of an error (compatibility of visibility or rights problem) | b) Obtaining a List of Channel Level Visible Data

The "getListChannelData" function obtains a list of the references of the visible data registered for a channel. The visibility of the session to which this data belongs must be of "PUB" or "PROT" type.

| Parameter | Type | Comment |
| --- | --- | --- |
| refChannel | Obligatory parameter | Channel reference |
| | Return value | List of references of visible data or "NULL" in the event of an error (compatibility of visibility or rights problem) |

8) Dereferencing Data

The "unregisterData" function dereferences data.

| Parameter | Type | Comment |
| --- | --- | --- |
| refData | Obligatory parameter | Data reference |
| | Return | Reference of data that has just |

-continued

| Parameter | Type | Comment |
|---|---|---|
| | value | been eliminated or "NULL" in the event of an error (compatibility of visibility or rights problem) |

The invention claimed is:

1. A management unit for managing a channel in a telecommunications network, the management unit comprising:
   a registering section configured to define and register a visibility attribute associated with a first channel belonging to a first session for accessing a service in the telecommunications network;
   a receiving section configured to receive a request to obtain information on the first channel from a second channel, the second channel belonging to the first session or a second session for accessing the service;
   a sending section configured to determine and send, as a response to the request, information on the first channel, only if the first channel is visible to the second channel, taking into account the visibility attribute associated with the first channel, and further taking into account whether the second channel belongs to the first session or the second session; and
   a register for a visibility attribute associated with data, wherein the receiving section is configured to receive a request to obtain information on the data, and wherein the sending section is configured to determine and send a response to the request to obtain information on the data, taking into account the visibility attribute associated with the data, and
   wherein the visibility attribute associated with the first channel indicates one of at least the following three channel types:
      a public channel type which is visible to all channels,
      a protected channel type which is visible to all other channels of the session to which the protected channel belongs, and
      a private channel type which is not visible to any other channel.

2. The management unit according to claim 1, further comprising:
   a register for a visibility attribute associated with one of at least two sessions enabling access to the service,
   wherein the receiving section is configured to receive a request to obtain information on one of the at least two sessions, and
   wherein the sending section is configured to determine and send a response to the request to obtain information on one of the at least two sessions, taking into account the visibility attribute associated with the one of the at least two sessions.

3. The management unit according to claim 2, wherein the sending section is configured to determine and send the response to the request to obtain information on the first channel taking into account a visibility attribute associated with a session to which the first channel belongs and taking into account a set of rules.

4. The management unit according to claim 1, comprising:
   a register for a right to read and/or write associated with the data,
   wherein the receiving section is configured to receive a request to read or modify the data, and
   wherein the sending section is configured to determine and send a response to the request taking into account the right to read and/or write and the visibility attribute associated with the data.

5. The management unit according to claim 1, wherein the data is attached to a given channel, and the sending section is configured to determine and send the response to the request to obtain information on the data taking into account the visibility attribute associated with the given channel and taking into account a set of rules.

6. The management unit according to claim 5, wherein the sending section is configured to determine and send the response to the request to obtain information on the data taking into account a session to which the data is attached and a session from which the request to obtain information on the data comes.

7. The management unit according to claim 1, wherein the data is attached to a given session, and the sending section is configured to determine and send the response to the request to obtain information on the data taking into account the visibility attribute associated with the given session and taking into account a set of rules.

8. A method of managing a channel in a telecommunications network, the management method comprising:
   defining and registering, by a receiving section, a visibility attribute associated with a first channel belonging to a first session for accessing a service in the telecommunications network;
   receiving a request to obtain information on the first channel from the second channel, the second channel belonging to the first session or a second session for accessing the service;
   determining and sending, as a response to the request, information on the first channel, only if the first channel is visible to the second channel, taking into account the visibility attribute associated with the first channel, and further taking into account whether the second channel belongs to the first session or the second session; and
   registering a visibility attribute associated with data, wherein the receiving section is configured to receive a request to obtain information on the data, and wherein the sending section is configured to determine and send a response to the request to obtain information on the data, taking into account the visibility attribute associated with the data, and
   wherein the visibility attribute associated with the first channel indicates one of at least the following three channel types:
      a public channel type which is visible to all channels,
      a protected channel type which is visible to all other channels of the session to which the protected channel belongs, and
      a private channel type which is not visible to any other channel.

9. A computer memory including a computer program comprising instructions for executing the steps of the management method according to claim 8 when the program is executed by a computer.

10. A non-transitory storage medium readable by a computer storing a computer program comprising instructions for executing the steps of the management method according to claim 8.

11. A management unit for managing a channel in a telecommunications network, the management unit comprising:
   a registering section configured to define and register a visibility attribute associated with a first channel belonging to a first session for accessing a service in the telecommunications network upon reception of a request to register the first channel;
a receiving section configured to receive a request to obtain data attached to the first channel from a second channel, the second channel belonging to the first session or a second session for accessing the service;
a sending section configured to determine and send, as a response to the request, data attached to the first channel, only if the first channel is visible to the second channel, taking into account the visibility attribute associated with the first channel, and further taking into account whether the second channel belongs to the first session or the second session; and
a register for a visibility attribute associated with the data attached to the first channel, wherein the sending section is configured to determine and send a response to the request to obtain the data attached to the first channel, taking into account the visibility attribute associated with the data attached to the first channel.

* * * * *